(12) United States Patent
Wildfang

(10) Patent No.: US 8,985,142 B2
(45) Date of Patent: Mar. 24, 2015

(54) FLOW QUANTITY REGULATOR

(75) Inventor: Fabian Wildfang, Badenweiler (DE)

(73) Assignee: Neoperl GmbH, Mullheim (DE)

( * ) Notice: Subject to any disclaimer, the term of this patent is extended or adjusted under 35 U.S.C. 154(b) by 659 days.

(21) Appl. No.: 13/140,196

(22) PCT Filed: Dec. 10, 2009

(86) PCT No.: PCT/EP2009/008814
§ 371 (c)(1),
(2), (4) Date: Jun. 16, 2011

(87) PCT Pub. No.: WO2010/075943
PCT Pub. Date: Jul. 8, 2010

(65) Prior Publication Data
US 2011/0247702 A1  Oct. 13, 2011

(30) Foreign Application Priority Data
Dec. 30, 2008 (DE) ............... 20 2008 017 031 U

(51) Int. Cl.
*F16K 15/14* (2006.01)
*E03C 1/086* (2006.01)
*B05B 1/30* (2006.01)
*B05B 1/18* (2006.01)

(52) U.S. Cl.
CPC ............ *E03C 1/086* (2013.01); *B05B 1/3006* (2013.01); *B05B 1/18* (2013.01)
USPC .................... 137/515.7; 137/843; 138/46

(58) Field of Classification Search
USPC ............ 137/515.7, 512.15, 515, 843, 903; 138/46, 41, 43
See application file for complete search history.

(56) References Cited

U.S. PATENT DOCUMENTS 3,138,177 A * 6/1964 Cutler ............................ 138/46
3,630,444 A  12/1971 Nelson
(Continued)

FOREIGN PATENT DOCUMENTS

DE       2623191        12/1977
DE    202007008808      10/2007
(Continued)

*Primary Examiner* — Kevin Lee
*Assistant Examiner* — P. Macade Nichols
(74) *Attorney, Agent, or Firm* — Volpe and Koenig, P.C.

(57) ABSTRACT

The invention relates to a flow volume regulator (1) having at least one throttle body (2) which is composed of elastically deformable material and which is arranged in the throughflow duct (3) of a regulator housing (4) and which delimits a control gap (5) between itself and a regulating profiling provided on an inner circumferential and/or outer circumferential duct wall, the clear throughflow cross section of which control gap (5) can be varied as a result of the throttle body (2) which can be deformed under the pressure of the medium flowing through, with the regulating housing (4) bearing on its outer circumference a clamping edge region for clamping the flow volume regulator (1) between two line sections or line components which are connected to one another. The flow volume regulator (1) according to the invention is characterized in that the regulator housing (4) is arranged in the ring opening of a sealing ring (6) and in that the end surfaces (7, 8) on the inflow and outflow sides of the sealing ring (6) form the clamping edge region. The flow volume regulator (1) according to the invention can be easily installed into a sanitary supply line even under restricted spatial conditions, with the sealing ring (6) which is provided as a clamping edge region of the regulator housing (4) sealing off the end sides, which face toward one another, of the line sections to be connected to one another.

14 Claims, 9 Drawing Sheets

(56) References Cited

U.S. PATENT DOCUMENTS

| | | | |
|---|---|---|---|
| 3,700,001 A | 10/1972 | Rudel | |
| 3,847,178 A | 11/1974 | Keppel | |
| 6,216,741 B1 * | 4/2001 | Aarntzen | 138/43 |
| 7,871,023 B2 * | 1/2011 | Grether | 239/600 |

FOREIGN PATENT DOCUMENTS

| | | |
|---|---|---|
| EP | 0733748 | 9/1996 |
| EP | 1043452 | 10/2000 |
| WO | 9932608 | 7/1999 |

* cited by examiner

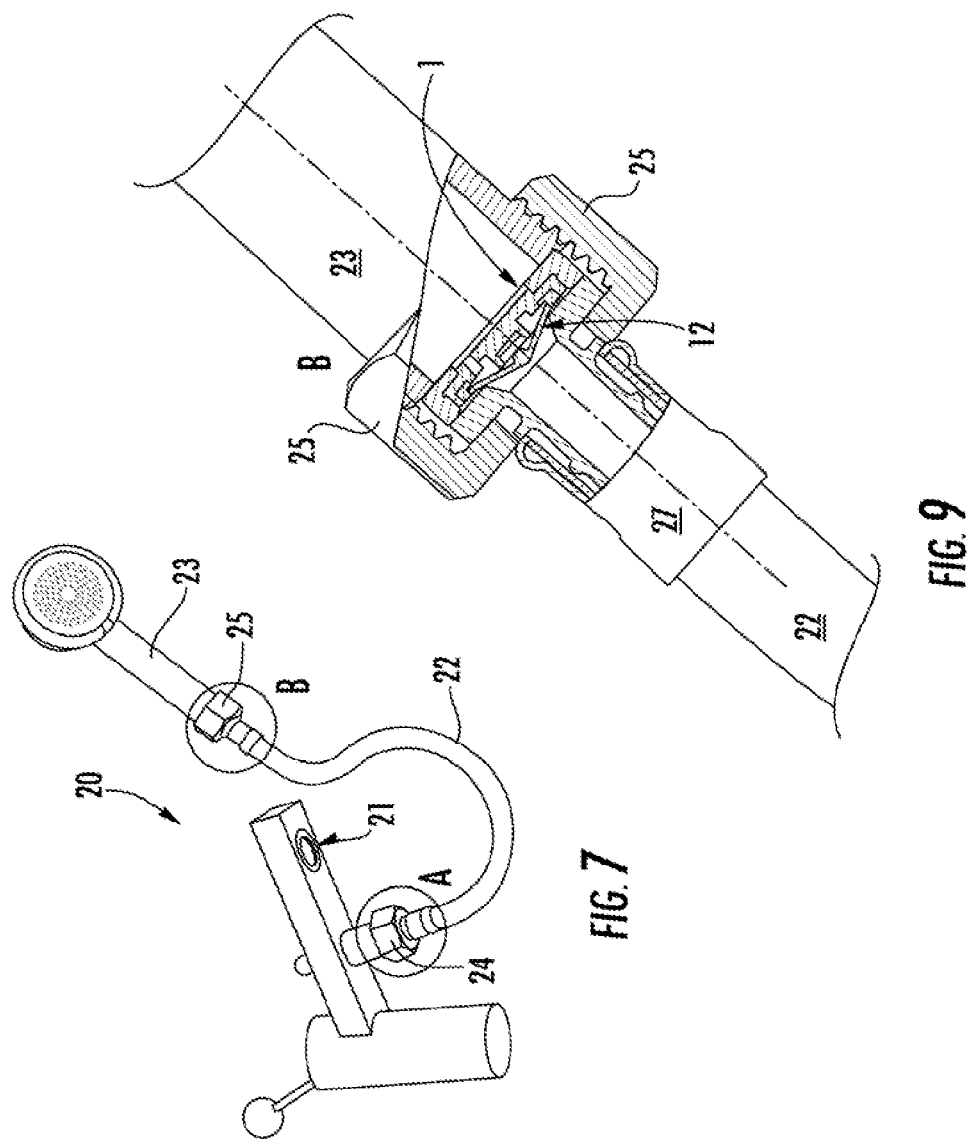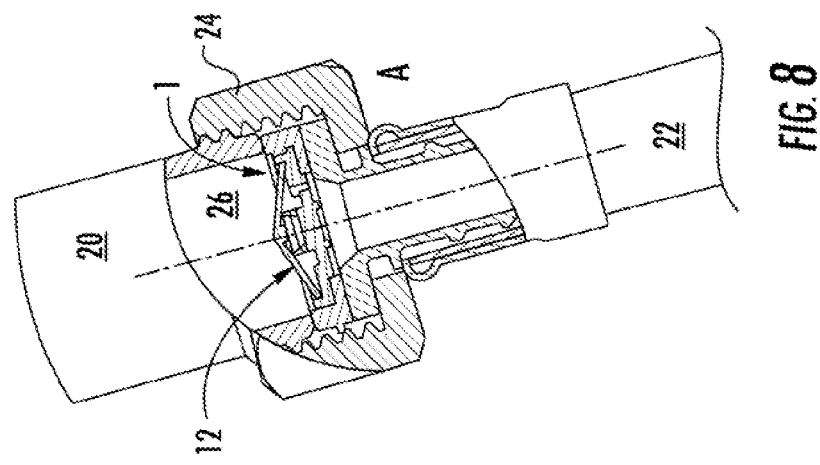

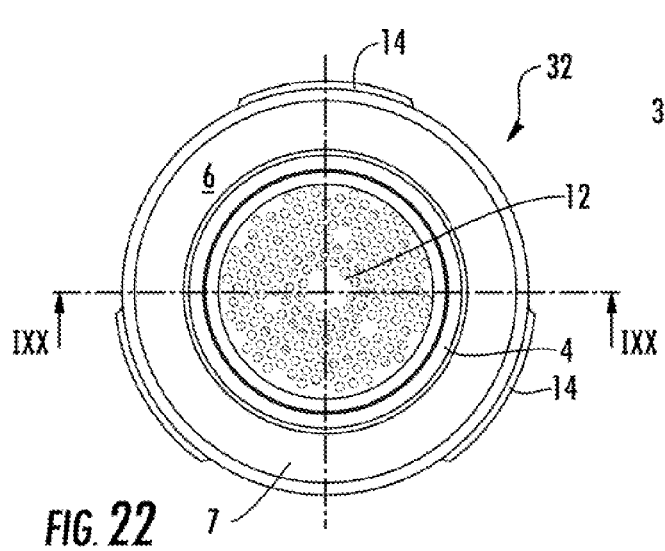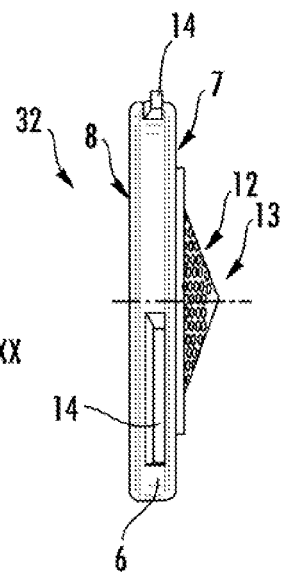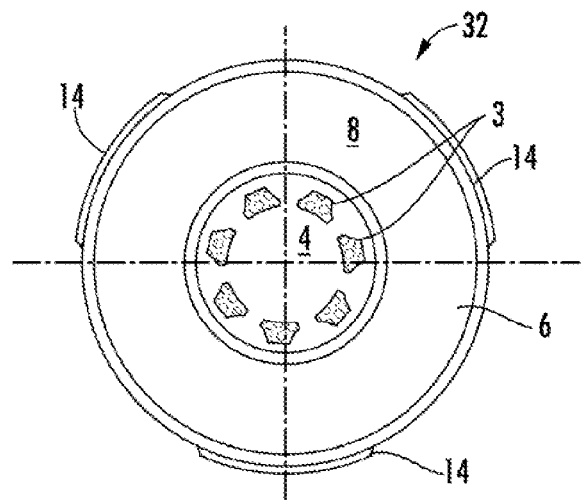
FIG. 22
FIG. 24
FIG. 23

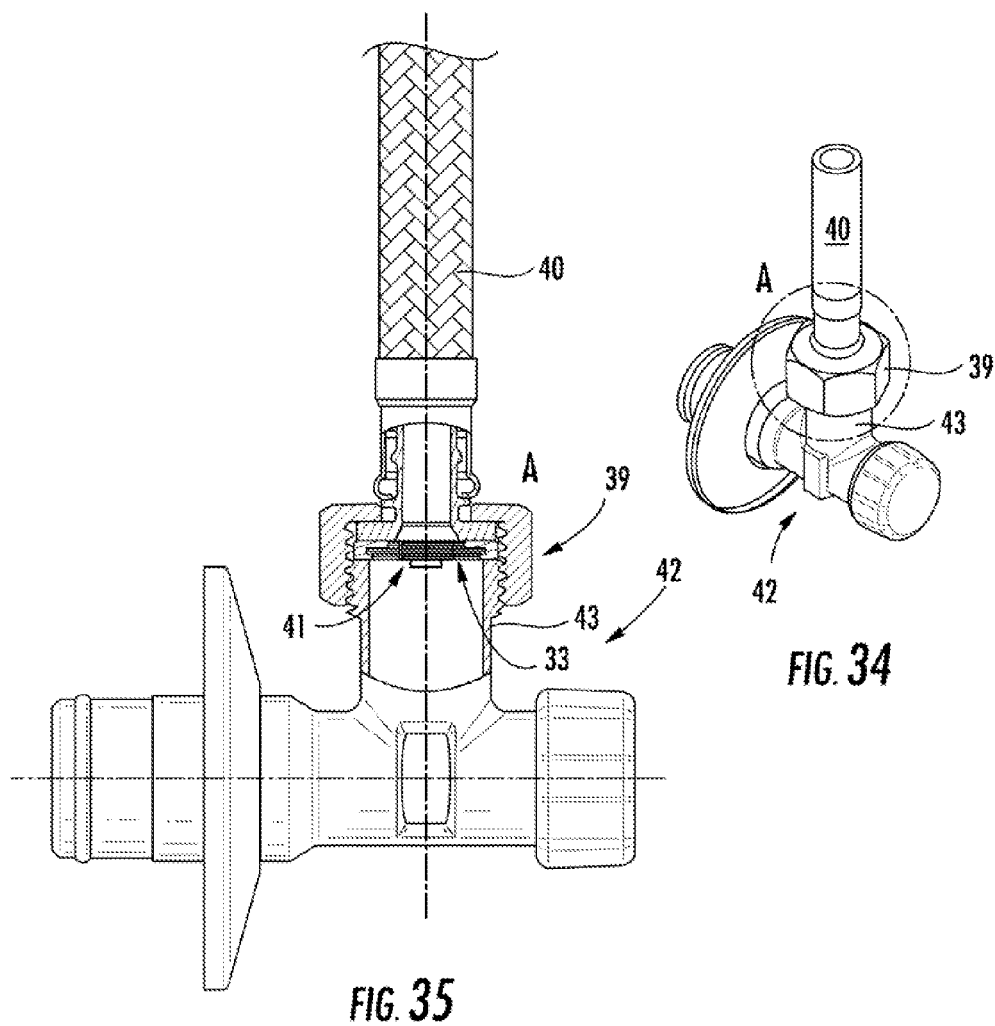

FLOW QUANTITY REGULATOR

BACKGROUND

The invention relates to a flow volume regulator having at least one throttle body which is composed of elastically deformable material and which is arranged in the throughflow duct of a regulator housing and which delimits a control gap between itself and a regulating profiling provided on an inner circumferential and/or outer circumferential duct wall, the clear throughflow cross section of which control gap can be varied as a result of the throttle body which can be deformed under the pressure of the medium flowing through, with the regulating housing bearing on its outer circumference a clamping edge region for clamping the flow volume regulator between two line sections or line components which are connected to one another.

Flow volume regulators are designed to be inserted into sanitary water lines in order to define, independently of the water pressure, a maximum value for the water quantity which can be extracted from said water lines. Flow volume regulators of said type are already known in various embodiments.

For example, DE 20 2007 008 808 U1 and DE 26 23 191 A1 have already disclosed flow volume regulators which are designed for water economization in showers. The already-known flow volume regulators have a housing which bears, in its face end regions, in each case one connecting thread. By means of the connecting threads provided in the face end regions, the regulator housing of said already-known flow volume regulator can be connected into the water line which leads to a shower head. The already-known flow volume regulators can also be installed into a water line retroactively; it is however a disadvantage that the regulator housing of said already-known flow volume regulator remains visible on account of the form and colour which are not matched to the existing line sections, and said regulator housing can therefore adversely affect the external appearance of the fitting.

A flow volume regulator has also been created having an annular throttle body which is composed of elastically deformable material and which is arranged in the throughflow duct of a regulator housing and which delimits a control gap between itself and a regulating profiling, the clear throughflow cross section of which control gap can be varied as a result of the throttle body which can be deformed under the pressure of the medium flowing through. To fix said already-known flow volume regulator in the water line, and for example to brace said flow volume regulator between two pipeline fittings or between a water hose or a handheld shower, an annular flange is provided on the outer circumference of the regulator housing, which annular flange serves as a clamping edge region for the already-known flow volume regulator.

To be able to install the already-known flow volume regulator with its clamping edge region, which is integrally formed on the regulator housing, into a water line in a sealed fashion, corresponding rubber seals must be provided on both sides of the already-known flow volume regulator. Since the clamping edge region and the rubber seals provided at both sides require a not inconsiderable amount of space, retroactive installation of the already-known flow volume regulator is not always possible. Furthermore, the installation of the already-known flow volume regulator is also hindered if that partial region of the regulator housing which protrudes beyond the clamping edge region does not fit into the clear line cross section.

A similar flow regulator is described in U.S. Pat. No. 3,847,178, for example.

A water line is already known from EP-A-1 042 452, which in the area of a screwed connection comprises a gasket between two adjacent line sections, with a sieve having a beaded jacket section being held, particularly in a friction fitting manner in the plugged in position, at the interior circumferential wall of the gasket, limiting the annular opening. Due to the fact that the sieve not considerably constricts the flow-through cross-section in the area of the screwed connection the sieve essentially presents no hydraulic resistance to the flowing water. Since the sieve represents no considerable hydraulic resistance, a friction-fitting fastening of the sieve is sufficient at the interior circumference of the gasket in the plugged in position. However, due to the fact that in flow regulators considerably higher hydraulic resistances develop regularly, such a friction-fitting connection of any components of the flow regulator would immediately be loosened by the pressure of the water flowing through it.

SUMMARY

It is therefore the object in particular to create a flow volume regulator which can be easily installed, and in particular also retrofitted, into a sanitary gas or water line even under restricted spatial conditions.

This object is achieved according to the invention in particular in that the regulator housing is arranged in the ring opening of a sealing ring and in that the end surfaces on the inflow and outflow sides of the sealing ring form the clamping edge region.

The regulator housing of the flow volume regulator according to the invention is arranged in the ring opening of a sealing ring whose end surfaces on the inflow and outflow sides form the clamping edge region. The flow volume regulator according to the invention may therefore be inserted in the manner of a sealing ring into the line connections of two line sections which are connected to one another, without additional sealing rings being required. In the case of retrofitting, the flow volume regulator can be situated at a location at which a seal was previously situated, with it then also being possible for the flow volume regulator according to the invention to replace said seal.

In a further embodiment according to the invention, the seal and the regulator housing are provided with an injection-moulded encapsulation, or said components of the flow volume regulator according to the invention are produced in a two-component or multi-component injection-moulding process. Here, in one preferred embodiment according to the invention, the sealing ring is formed as an injection-moulded encapsulation of the regulator housing and/or in that the regulator housing and the sealing ring which is connected thereto are formed as a multi-component injection-moulded part. Since, with said embodiment, it is possible to eliminate further method steps for assembling the regulator housing and sealing ring, said embodiment is characterized by simple and cost-effective production.

Here, a fixed and non-releasable connection between the regulator housing and the sealing ring is also additionally facilitated if the regulator housing has at least one through-passage opening which is aligned preferably in the longitudinal direction and through which the seal material of the sealing ring extends.

Since the regulator housing and the sealing ring have complementary outer contours or circumferential contours with respect to one another, said components are generally connected to one another in a positively locking fashion. In addition, or alternatively, it may be expedient for the regulator housing and the sealing ring to be connected to one another by means of frictional engagement, adhesive bonding or a cohesive connection or a selection of said connection types.

To be able to cost-effectively produce the sealing ring from rubber or from some other sealing, flexible material and the regulator housing from a relatively hard material, it is however also possible for the regulator housing to be releasably connected and preferably releasably latched in the ring opening of the sealing ring.

Here, in one preferred embodiment according to the invention, at least one latching groove or similar latching means is provided on the ring inner circumference which borders the ring opening, and said at least one latching groove or similar latching means can be releasably latched by at least one latching projection or similar mating latching means on the outer circumference of the regulator housing.

The regulator housing is held in a secure and fixed manner in the sealing ring even at high water pressures if the regulator housing can be inserted into the ring opening of the sealing ring from the inflow side or the outflow side as far as a radially inwardly protruding shoulder of said sealing ring.

In order that the regulator housing does not protrude in an obstructive manner beyond the sealing ring, and in order that the flow volume regulator according to the invention can be used in as versatile a manner as possible, it is advantageous if the regulator housing can be countersunk in the ring opening of the sealing ring. In said embodiment, the regulator housing does not protrude in an obstructive manner beyond the sealing ring on either side of the sealing ring.

The flow volume regulator according to the invention can be inserted and secured in a simple manner for example into the sleeve nut of a pipeline coupling if at least one retaining cam or retaining projection, which engages in the internal thread of a line coupling part, protrudes from the outer circumference of the sealing ring. The sleeve nut of a shower hose, which may be provided either at the fitting connection side or at the transition to the handheld shower, is a typical application.

Here, secure hold of the flow volume regulator according to the invention in a line coupling part of said type is additionally facilitated if a plurality of retaining projections are provided, preferably distributed regularly over the outer circumference of the sealing ring.

To ensure correct functioning of the flow volume regulator according to the invention at all times, it is advantageous if an ancillary sieve is positioned upstream of the flow volume regulator on the inflow side, said ancillary sieve protruding at most only by means of a central region, that preferably tapers conically in the inflow direction, over the outer contour of the regulator housing and sealing ring. The ancillary sieve which, in a central region, preferably tapers conically in the inflow direction, is capable of filtering out the dirt particles entrained in the medium, said dirt particles being deposited at the outer edge of the sieve on account of the special shaping of the ancillary sieve. A conically tapering ancillary sieve of said type also does not protrude in an obstructive manner into the clear line cross section of the adjacent pipeline since the free end region, which tapers to a point, of the conically tapering ancillary sieve can be kept sufficiently small in the circumferential region protruding beyond the sealing ring.

BRIEF DESCRIPTION OF THE DRAWINGS

Further features of the invention will emerge from the following description of the figures in conjunction with the claims. A preferred exemplary embodiment will be explained in more detail below on the basis of the drawing, in which:

FIG. 7 shows a sanitary outlet fitting which is connected by means of a flexible shower hose to a handheld shower, with the preferred installation alternatives for the flow volume regulator according to FIGS. 1 to 6 circled and denoted by A and B,
FIG. 8 shows the flow volume regulator from FIGS. 1 to 6 in the installation region A as per FIG. 7,
FIG. 9 shows the flow volume regulator from FIGS. 1 to 6 in the installation region B as per FIG. 7,
FIG. 22 shows the flow volume regulator from FIGS. 19 to 21 in a plan view of its inflow side, showing in particular the ancillary sieve which is positioned upstream of the flow volume regulator on the inflow side and is releasably connected to said flow volume regulator,
FIG. 23 shows the flow volume regulator from FIGS. 19 to 22 in a plan view of its outflow end side,
FIG. 24 shows the flow volume regulator from FIGS. 19 to 23 in a side view,
FIG. 34 shows, in a perspective view, an application example in which the flow volume regulator shown in FIGS. 25 to 30 is inserted into a wall-mounted angle valve,
and FIG. 35 shows a side view of the angle valve of the application example shown in FIG. 34, with the angle valve being illustrated in cut-open form in the region A from FIG. 34.

DETAILED DESCRIPTION OF THE PREFERRED EMBODIMENTS

Figure 1:
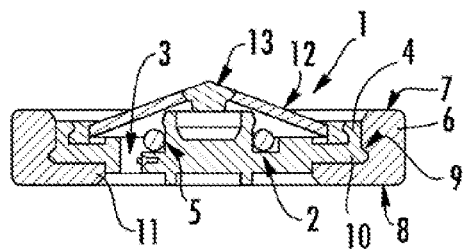
FIG. 1 shows a flow volume regulator, illustrated in longitudinal section, which is arranged in the ring opening of a sealing ring provided at the outer circumference.
Figure 2:
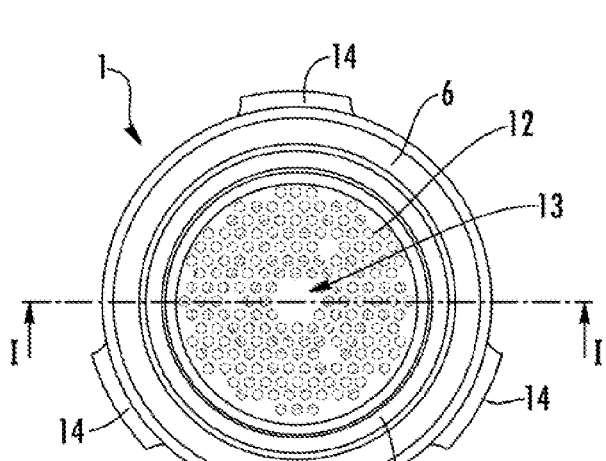
FIG. 2 shows the flow volume regulator from FIG. 1 in a plan view of its inflow side.
Figure 3:
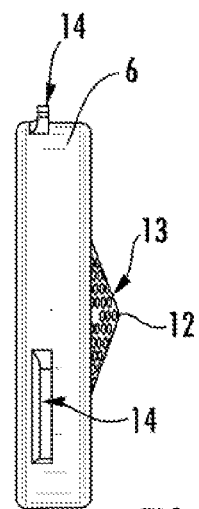
FIG. 3 shows the flow volume regulator from FIGS. 1 and 2 in a side view.
Figure 4:
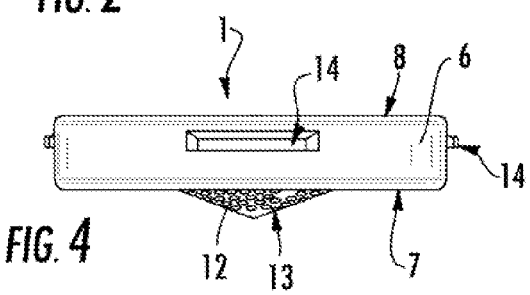
FIG. 4 shows the flow volume regulator from FIGS. 1 to 3 in a side view rotated slightly in relation to FIG. 3.
Figure 5:
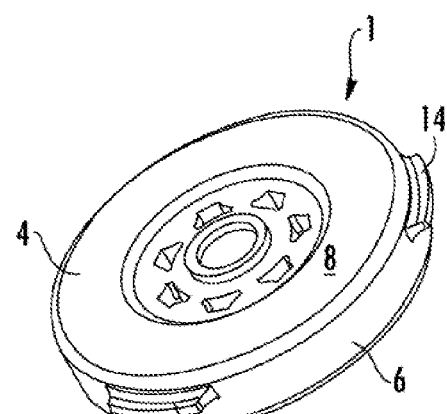
FIG. 5 shows the flow volume regulator from FIGS. 1 to 4 in a perspective plan view of its outflow end side.
Figure 6:
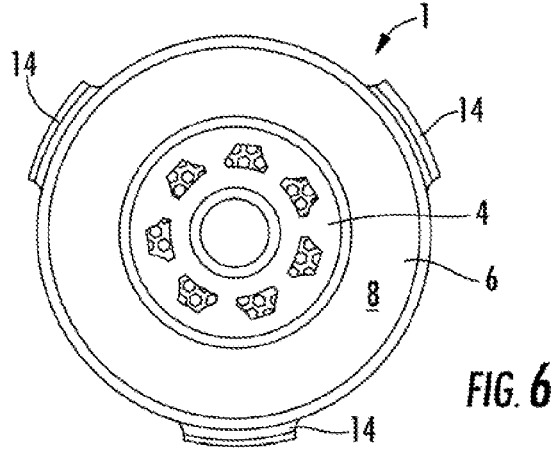
FIG. 6 shows the flow volume regulator from FIGS. 1 to 5 in a plan view of its outflow end side.
Figure 10:
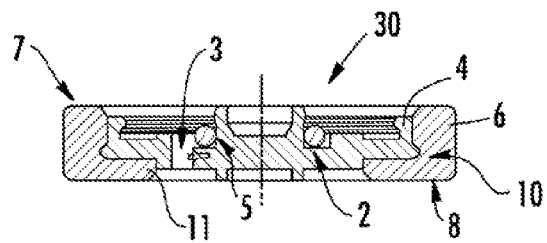
FIG. 10 shows a flow volume regulator, illustrated in longitudinal section through section plane X-X in FIG. 11, which—similarly to that in FIGS. 1 to 6—is arranged in the ring opening of a sealing ring provided at the outer circumference, with the flow volume regulator shown here having no inflow-side ancillary sieve, and being characterized by a particularly flat outer contour.
Figure 11:
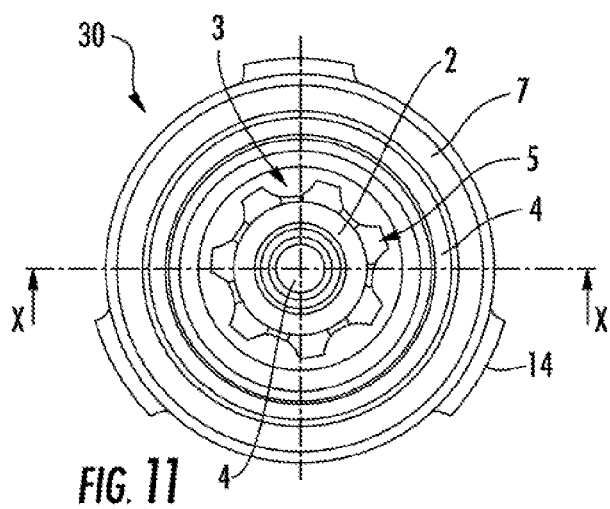
FIG. 11 shows the flow volume regulator from FIG. 10 in a plan view of its inflow side.
Figure 14:
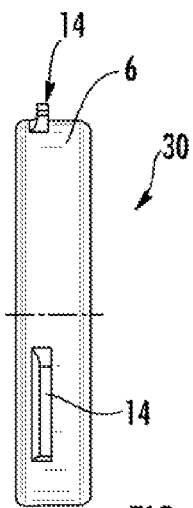
FIG. 14 shows the flow volume regulator from FIGS. 10 to 13 in a side view rotated slightly in relation to FIG. 13.
Figure 12:
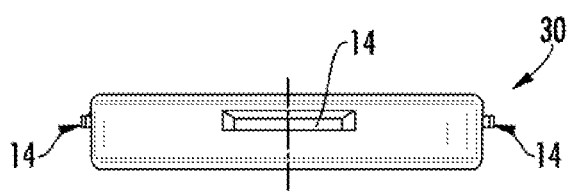
FIG. 12 shows the flow volume regulator from FIGS. 10 and 11 in a side view.
Figure 13:
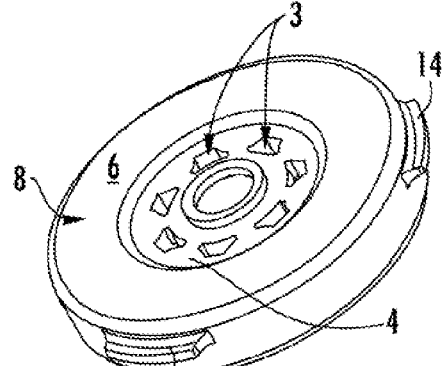
FIG. 13 shows the flow volume regulator from FIGS. 10 to 12 in a perspective plan view of its outflow end side.
Figure 15:
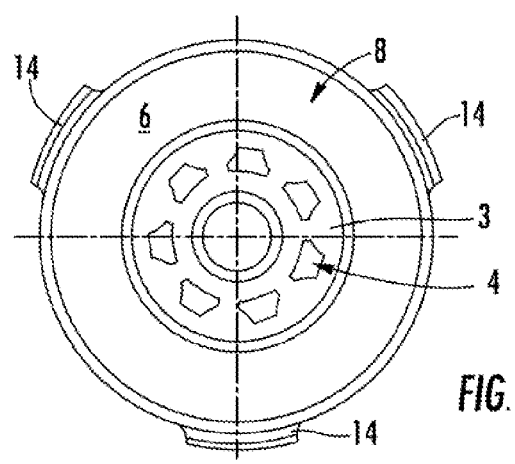
FIG. 15 shows the flow volume regulator from FIGS. 10 to 14 in a plan view of its outflow end side.

FIGS. 1 to 6, 8 to 33 and 35 show a flow volume regulator 1, 30, 31, 32 and 33 having an annular throttle body 2 composed of elastically deformable material, which throttle body 2 is arranged in the throughflow duct 3 of a regulator housing 4. The throttle body 2 delimits a control gap 5 between itself and a regulating profiling provided on an inner circumferential or outer circumferential duct wall, the clear throughflow cross section of which control gap 5 can be varied as a result of the throttle body 2 which can be deformed under the pressure of the medium flowing through. Since the throttle body 2 which is composed of elastically deformable material is deformed under the pressure of the inflowing water, and since the control gap 5 is progressively constricted as the pressure of the inflowing water increases, a maximum value can be defined for the volume, which flows through per unit time, of the medium passing through the throughflow duct 3.

As can be seen in FIGS. 1 to 6, 8 to 33 and 35, the regulator housing 4 of the flow volume regulator 1, 30, 31, 32 and 33 has on its outer circumference a clamping edge region which is provided for clamping the flow volume regulator 1 between two line sections or line components, which are connected to one another, of a sanitary supply line. Here, it can be seen particularly clearly in FIGS. 1, 10, 16, 19, 21, 28, 31 and 35 that the regulator housing 4 is arranged in the ring opening of a sealing ring 6 whose end surfaces 7, 8 on the inflow and outflow sides form the clamping edge region. The flow volume regulator 1 can thus be inserted for example into the sleeve nut of a pipeline coupling, with the clamping edge region, which is formed by the sealing ring 6, of said flow volume regulator 1 serving to seal off to the outside the end surfaces, which bear against one another, of the adjoining line sections.

FIGS. 1, 10, 19, 21, 28, 31 and 35 show that the regulator housing 4 of the flow volume regulator 1, 30, 32, and 33 can be releasably latched in the ring opening of the sealing ring 6. For this purpose, an encircling latching groove 9 is proved on the ring inner circumference, which borders the ring opening, of the sealing ring 6, which latching groove 9 can be releasably latched by a likewise encircling latching projection 10 on the outer circumference of the regulator housing 4.

The regulator housing 4 can be inserted into the ring opening of the sealing ring 6 from the inflow side of said sealing ring 6 as far as a radially inwardly protruding shoulder 11. Here, the regulator housing 4 can be countersunk practically completely in the ring opening of the sealing ring 6, such that the regulator housing 4 practically no longer protrudes beyond the sealing ring 6 at either side.

Figure 16:
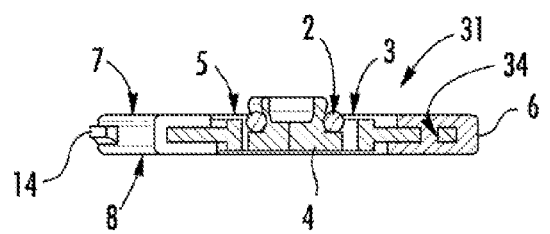
FIG. 16 shows a flow volume regulator illustrated in a longitudinal section through section plane XVI-XVI in FIG. 18, in which flow volume regulator the regulator housing bears at the outer side a sealing ring which is formed as an injection-moulded encapsulation of the regulator housing, with the flow volume regulator here also making do without an inflow-side ancillary sieve.
Figure 17:
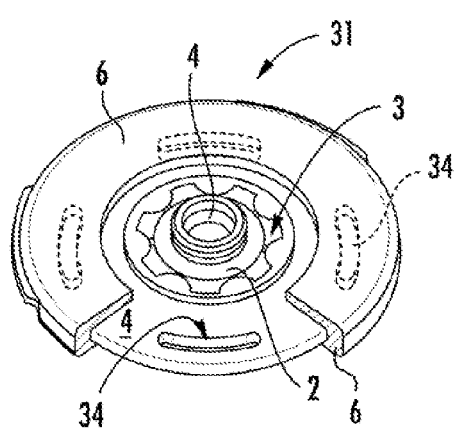
FIG. 17 shows the flow volume regulator from FIG. 16, partially cut away in the region of its sealing ring, in a perspective plan view of its inflow side.
Figure 18:
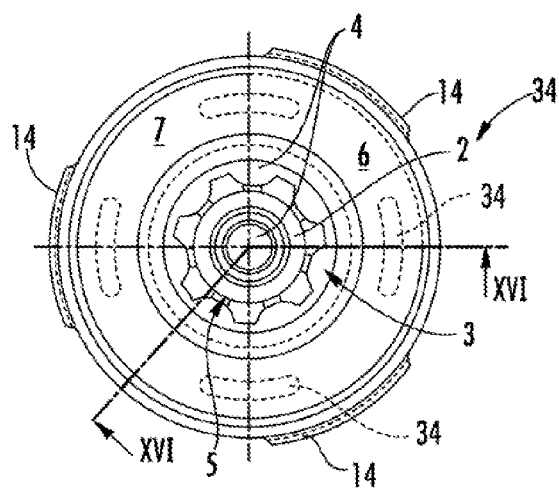
FIG. 18 shows the flow volume regulator from FIGS. 16 and 17 in a plan view of its outflow end side.
Figure 20:
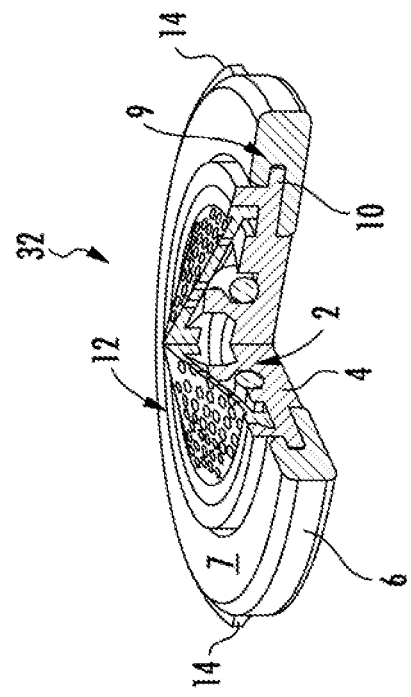
FIG. 20 shows the flow volume regulator from FIG. 19 in an enlarged partial longitudinal section in the region of a control gap which is provided
between an elastic throttle body and a regulating profiling situated on the outer circumferential duct wall.
Figure 19:
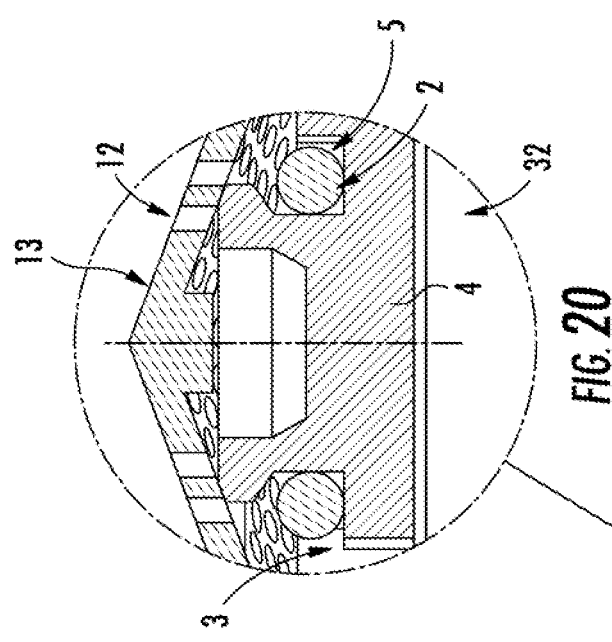
FIG. 19 shows a flow volume regulator similar to that in FIGS. 1 to 6 in a longitudinal section through section plane XIX-XIX in FIG. 20.
Figure 21:
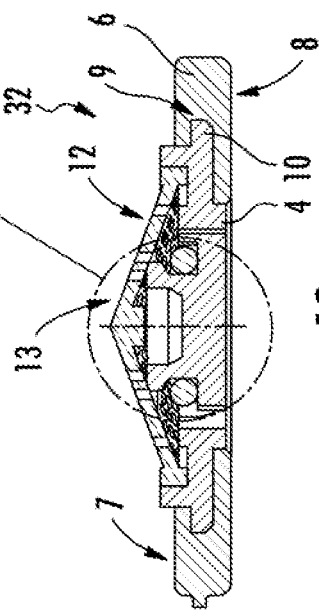
FIG. 21 shows the flow volume regulator from FIGS. 19 and 20 in a perspective partial longitudinal section.
Figure 25:
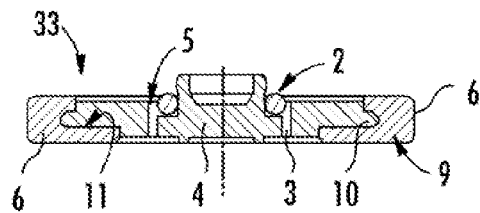
FIG. 25 shows a flow volume regulator similar to that in FIGS. 10 to 15 in a longitudinal section through section plane XXV-XXV in FIG. 26.
Figure 26:
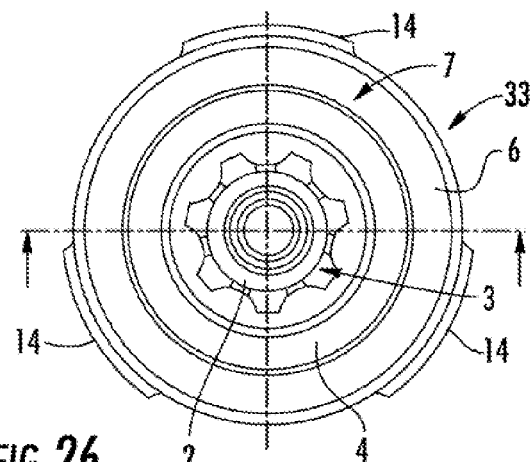
FIG. 26 shows the flow volume regulator from FIG. 25 in a plan view of its outflow end side.
Figure 28:
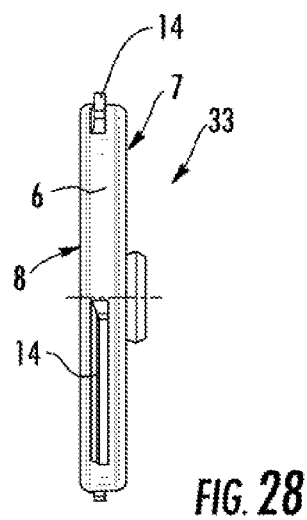
FIG. 28 shows the flow volume regulator from FIGS. 25 to 27 in a side view rotated in the circumferential direction.
Figure 27:
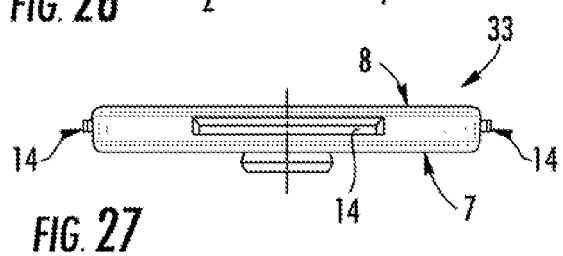
FIG. 27 shows the flow volume regulator from FIGS. 25 and 26 in a side view.
Figure 30:
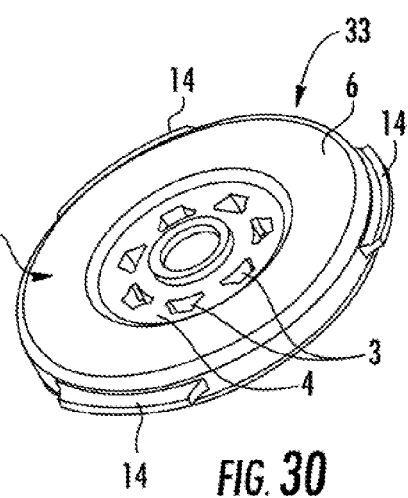
FIG. 30 shows the flow volume regulator from FIGS. 25 to 29 in a perspective plan view of its outflow end side.
Figure 29:
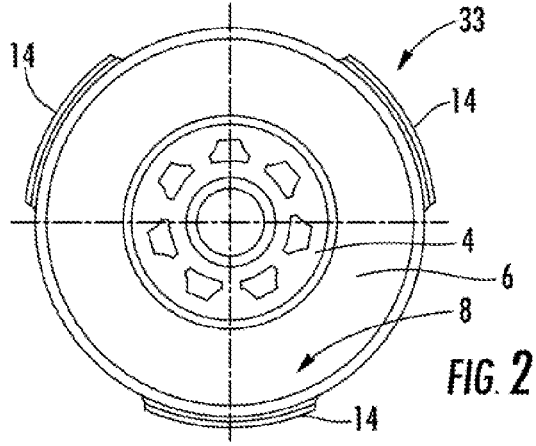
FIG. 29 shows the flow volume regulator from FIGS. 25 to 28 in a plan view of its outflow end side.

In contrast, the sealing ring 6 of the flow volume regulator 31 illustrated in FIGS. 16 to 18 is formed as an injection-moulded encapsulation of the regulator housing 4. Here, the regulator housing 4 also has an annular flange on the outer circumference, which annular flange has three through-passage openings 34. The flexible seal material of the sealing ring 6 extends through the through-passage openings 34 which are preferably spaced apart from one another uniformly in the circumferential direction and which are in particular of circular-arc-shaped design and which are aligned with their longitudinal axis approximately in the longitudinal direction of the flow volume regulator 31. In this way, it is possible for the sealing ring 6 and the regulator housing 4 of the flow volume regulator 31, which is preferably produced as a two-component or multi-component injection-moulded part, to be fixedly and non-releasably connected to one another in a simple manner.

To connect the components 4, 6 to one another in a fixed and non-releasable manner, it is additionally or alternatively also possible for the regulator housing and the seal to be connected to one another by means of frictional engagement, adhesive bonding or a cohesive connection or a selection of said connection types.

To ensure the functional reliability of the flow volume regulator according to the invention at all times, and in order to be able to filter out any dirt particles entrained in the sanitary supply line, it is advantageous for an ancillary sieve 12 to be positioned upstream of the flow volume regulator 1, 32 on the inflow side, which ancillary sieve protrudes at most only by means of a central region 13, that tapers conically in the inflow direction, over the outer contour of the regulator housing 4 and sealing ring 6.

In contrast, no ancillary sieve is provided in the flow volume regulator 30, 31 and 33, such that said flow volume regulators 30, 31 and 33 are characterized by their particularly flat structural height.

FIGS. 2 to 6, 11 to 15, 17 to 18, 19, 21 to 24 and 26 to 30 clearly show that a plurality of retaining cams or similar retaining projections 14 protrude from the outer circumference of the sealing ring 6, which retaining cams or retaining projections 14 engage into the internal thread of a line coupling part which is embodied for example as a sleeve nut. In this case, the flow volume regulator 1 illustrated here provides a plurality of retaining projections 14, preferably distributed regularly over the outer circumference of the sealing ring 6.

In the flow volume regulator 1, 30, 31, 32, 33 illustrated here, an annular seal is integrated by means of the sealing ring 6. Here, the flow volume regulator 1, 30, 31, 32, 33 is characterized by a comparatively low structural height, which enables the flow volume regulator 1, 30, 31, 32, 33 to be installed in virtually any installation situation. The projections 14 provided on the outer circumference of the seal ring 6 may also, in conjunction with the elasticity of the material used for the sealing ring 6 and its retaining projections 14, mould securely and fixedly into the corresponding line coupling part in such a way that the flow volume regulator 1, 30, 31, 32, 33 is held practically captively in the respective line section even in the pre-assembled state of the latter. Even though no further seals are required for the flow volume regulator 1, 30, 31, 32, 33 illustrated here, the flow volume regulator is capable of sealing off to the outside the end sides, which face towards one another, of the line sections to be connected to one another. Even though the flow volume regulator 1, 30, 31, 32, 33 is capable of captively holding firstly the regulator housing 4 and the sealing ring 6 and secondly the flow volume regulator in a pre-assembled position, it is also possible to realize other throughflow classes using the same sealing ring 6 in conjunction with other flow volume regulators. Here, the flow volume regulator 1, 30, 31, 32, 33 illustrated here may for example also be accommodated in the line coupling part provided on a handheld shower or on a shower hose.

FIGS. 7 to 9 show typical application example for the flow volume regulator 1 illustrated in FIGS. 1 to 6. Here, FIG. 7 illustrates a sanitary outlet fitting 20 which can be arranged for example in the region of a bathtub. The sanitary outlet fitting 20 firstly has a water outlet 21 and secondly is connected by means of a flexible shower hose 22 to a handheld shower 23. To limit the water quantity flowing to the handheld shower 23 to a maximum volume per unit time, the flow volume regulator 1 may be arranged for example in the sleeve nut 24, which can be mounted on the outlet fitting 20, of the shower hose 22 in the installation situation A as per FIG. 8, or in the sleeve nut 25 which is provided at the transition to the handheld shower 23 in the installation situation B as per FIG. 9. It is a particular advantage of the flow volume regulator illustrated here that, even in different installation situations, said flow volume regulator can be easily inserted such that the ancillary sieve 12 is always arranged in the functionally correct position on the inflow side of the flow volume regulator 1, and protrudes either into the clear pipe cross section 26 of the outlet fitting 20 or into the clear hose cross section 27 of the flexible shower hose 22.

Figure 31:
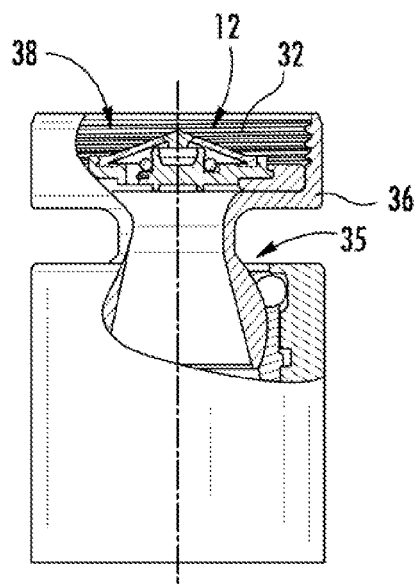
FIG. 31 shows the flow volume regulator from FIGS. 19 to 24 in an application example in a partially longitudinally sectioned view, in which the flow volume regulator is inserted into a ball-joint water outlet.
Figure 32:
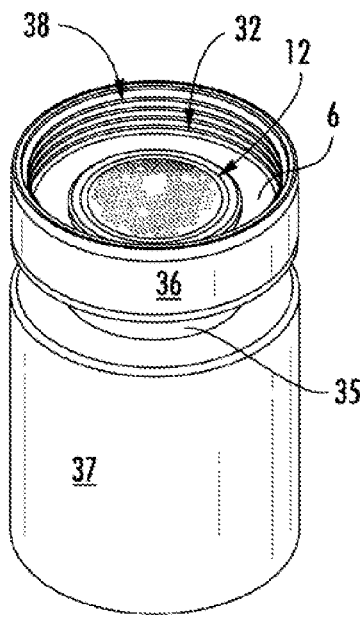
FIG. 32 shows the application example from FIG. 31 in a perspective side view.
Figure 33:
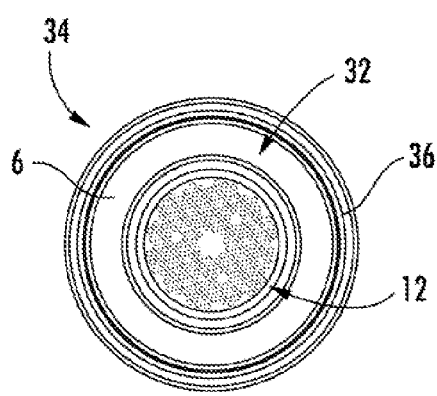
FIG. 33 shows the application example from FIGS. 31 and 32 in a plan view of the inflow side of the flow volume regulator which is inserted into the ball joint water outlet.

FIGS. 31 to 33 show a further exemplary embodiment in which the flow volume regulator 32 from FIGS. 19 to 24 can be inserted into a ball joint water outlet 34. The ball joint water outlet 34 has two joint parts 36, 37 which are articulatedly connected to one another by means of a ball joint 35 and of which the inflow-side joint part 36 has a threaded opening 38 with an internal thread which can be screwed onto the external thread on the outlet end of a sanitary outlet fitting. From the partial longitudinal section in FIG. 31, it can be seen that the flow volume regulator 32 can if appropriate also be exchanged for the sealing ring and inserted into the threaded opening 38 retroactively. On account of the small structural height of the flow volume regulator 32, the latter can be inserted into the threaded opening 38 without being visible at all from the outside. The ball joint water outlet 34 which is equipped with the flow volume regulator 32 therefore forms a functionally highly concentrated unit which combines the functions of a seal, of an ancillary sieve, of a flow regulator and of a ball joint outlet in an extremely small space. Here, said highly concentrated unit can also be retroactively fastened to an existing sanitary outlet fitting.

FIGS. 34 and 35 illustrate a further exemplary embodiment in which the flow volume regulator 33 is inserted into the hose connection 39 of a water hose 40. Said hose connection 39 has a threaded opening 41 with an internal thread, by means of which internal thread the hose connection 39 is screwed to the external thread of an angle valve 42. Here, the flow volume regulator 33 which is inserted into the threaded opening 41 of the hose connection 39 also replaces a sealing ring which is otherwise conventionally clamped at the same location between the hose connection 39 and the threaded pipe stub 43, which has the external thread, of the angle valve 42.

The flow volume regulators illustrated here can be easily installed into a sanitary water line even under restricted spatial conditions, wherein the flow volume regulators, by means of their clamping edge region formed by the sealing ring 6, also seal off to the outside the adjoining end sides of the line sections which are to be connected to one another.

The regulator housing 4 may for example be produced from a thermoplastic and the sealing ring 6 may for example be produced from an elastomer, a thermoplastic elastomer or a soft thermoplastic. Where reference is made here to a multi-component injection-moulded part, this is to be understood not only to include injection-moulding processes which take place in direct succession in terms of time and/or for example in a single injection-moulding tool, but rather also to mean injection-moulding processes in which, to produce the injection-moulded part, a plurality of components are formed or shaped with one another in different tools, if appropriate also at relatively long time intervals, to form an injection-moulded part.

The invention claimed is:

1. A flow volume regulator (1, 30, 31, 32, 33) comprising at least one throttle body (2) which is comprised of elastically deformable material and which is arranged in a throughflow duct (3) of a regulator housing (4) and which delimits a control gap (5) between itself and a regulating profiling provided on at least one of an inner circumferential or outer circumferential duct wall, a clear throughflow cross section of said control gap (5) can be varied as a result of the throttle body (2) which is deformable under pressure of a medium flowing therethrough, the regulating housing (4) bearing on an outer circumference thereof a clamping edge region for clamping the flow volume regulator (1, 30, 31, 32, 33) between two line sections or line components which are connected to one another, the regulator housing (4) is arranged in a ring opening of a sealing ring (6) and end surfaces (7, 8) on inflow and outflow sides of the sealing ring (6) form the clamping edge region.

2. The flow volume regulator according to claim 1, wherein the sealing ring (6) is formed as an injection-moulded encapsulation of the regulator housing (4).

3. The flow volume regulator according to claim 1, wherein the regulator housing (4) has at least one through-passage opening (34) which is aligned in a longitudinal direction and through which a seal material of the sealing ring (6) extends.

4. The flow volume regulator according to claim 1, wherein the regulator housing (4) and the sealing ring (6) are connected to one another by frictional engagement, adhesive bonding or a cohesive connection or a combination thereof.

5. The flow volume regulator according to claim 1, wherein the regulator housing (4) is releasably connected in the ring opening of the sealing ring (6).

6. The flow volume regulator according to claim 5, whereat least one latching groove (9) or similar latching means is provided on the ring inner circumference which borders the ring opening, and said at least one latching groove (9) or similar latching means can be releasably latched by at least one latching projection (10) or similar mating latching means on the outer circumference of the regulator housing (4).

7. The flow volume regulator according to claim 1, wherein the regulator housing (4) is insertable into the ring opening of the sealing ring (6) from the inflow side or the outflow side up to a radially inwardly protruding shoulder (11) of said sealing ring (6).

8. The flow volume regulator according to claim 1, wherein the regulator housing (4) is countersunk in the ring opening of the sealing ring (6).

9. The flow volume regulator according to claim 1, wherein at least one retaining cam or retaining projection (14), which engages in an internal thread of a line coupling part, protrudes from an outer circumference of the sealing ring (6).

10. The flow volume regulator according to claim 9, wherein a plurality of the retaining projections (14) are provided.

11. The flow volume regulator according to claim 1, wherein an ancillary sieve (12) is positioned upstream of the flow volume regulator (1) on the inflow side, said ancillary sieve protruding by a central region (13), that tapers conically in the inflow direction, over an outer contour of the regulator housing (4) and the sealing ring (6).

12. The flow volume regulator according to claim 1, wherein the regulator housing (4) and the sealing ring (6) which is connected thereto are formed as a multi-component injection-moulded part.

13. The flow volume regulator according to claim 1, wherein the regulator housing (4) is releasably latched in the ring opening of the sealing ring (6).

14. The flow volume regulator according to claim 10, wherein the retaining projections (14) are distributed regularly over an outer circumference of the sealing ring (6).

* * * * *